United States Patent
Tacchi et al.

(10) Patent No.: US 6,244,423 B1
(45) Date of Patent: Jun. 12, 2001

(54) METHODS AND APPARATUS FOR CLEANING ROTATING BELTS OF ITEM-SORTING MACHINES

(75) Inventors: Renato Tacchi, Lonate Pozzolo-VA; Fabio Marni, Arcisate-VA, both of (IT)

(73) Assignee: CML Handling Technology S.p.A., Lonate Pozzolo (VA) (IT)

( * ) Notice: Subject to any disclaimer, the term of this patent is extended or adjusted under 35 U.S.C. 154(b) by 0 days.

(21) Appl. No.: 09/332,158

(22) Filed: Jun. 14, 1999

(30) Foreign Application Priority Data

Jun. 12, 1998 (IT) .............................. MI98A01343

(51) Int. Cl.⁷ ........................... B65G 17/32; B65G 29/00; B65G 47/14; B65G 47/84; B65G 43/08; B65G 47/24

(52) U.S. Cl. ........................... 198/495; 198/493; 198/494

(58) Field of Search ................... 198/495, 493, 198/494

(56) References Cited

U.S. PATENT DOCUMENTS

| | | |
|---|---|---|
| 2,881,463 | 4/1959 | Vogel . |
| 3,571,866 * | 3/1971 | Brown, Jr. .................. 25/2 |
| 3,592,329 * | 7/1971 | Fleischauer .............. 209/563 |
| 3,673,759 * | 7/1972 | Ayres et al. .............. 53/459 |
| 3,751,749 * | 8/1973 | Wilson ..................... 15/92 |
| 4,095,802 * | 6/1978 | Horian et al. ............. 369/72 |
| 4,160,302 * | 7/1979 | Hirst et al. .............. 15/347 |
| 4,408,315 * | 10/1983 | Mehrotra et al. .......... 369/71 |
| 4,479,282 * | 10/1984 | Hallstrom ................ 15/311 |
| 4,744,707 * | 5/1988 | Negri et al. .............. 409/7 |
| 5,016,314 * | 5/1991 | Green ..................... 15/320 |
| 5,028,959 * | 7/1991 | Gooray .................... 399/93 |
| 5,067,192 * | 11/1991 | Guelfi et al. ............. 15/302 |
| 5,333,724 * | 8/1994 | Wingfield et al. ......... 198/495 |
| 5,432,975 * | 7/1995 | Hilmanowski .............. 15/320 |
| 5,465,828 * | 11/1995 | Thomas et al. ............ 198/495 |
| 5,555,598 * | 9/1996 | Grave et al. ............. 15/322 |
| 5,589,080 * | 12/1996 | Cho et al. ............... 210/791 |
| 5,706,932 * | 1/1998 | White .................... 198/495 |
| 5,711,050 * | 1/1998 | Pimentel ................. 15/302 |
| 5,941,365 * | 8/1999 | Ritter ................... 198/380 |
| 6,050,392 * | 4/2000 | Straub ................... 198/495 |
| 6,058,556 * | 5/2000 | Jones .................... 15/302 |

FOREIGN PATENT DOCUMENTS 0 771 745   5/1997  (EP) .
40858361 *  3/1996  (JP) .................. B60H/3/06

* cited by examiner

Primary Examiner—Christopher P. Ellis
Assistant Examiner—Jeffrey A. Shapiro
(74) Attorney, Agent, or Firm—Burns, Doane, Swecker & Mathis, L.L.P.

(57) ABSTRACT

A sorting system includes a trolley movable along a predetermined path and including an endless belt rotatable in a direction perpendicularly to the path for receiving and discharging items to be sorted. To clean a surface of the belt, a dispensing device and an aspirating device are suspended over the belt surface on an arm. With the belt rotating, the dispensing device sprays cleaning liquid onto the belt surface, and the aspirating device sucks up the cleaning liquid at a location downstream of the dispensing device with reference to the direction of belt travel. The arm can be raised and lowered and/or moved parallel to the path for cleaning other trolleys.

7 Claims, 1 Drawing Sheet

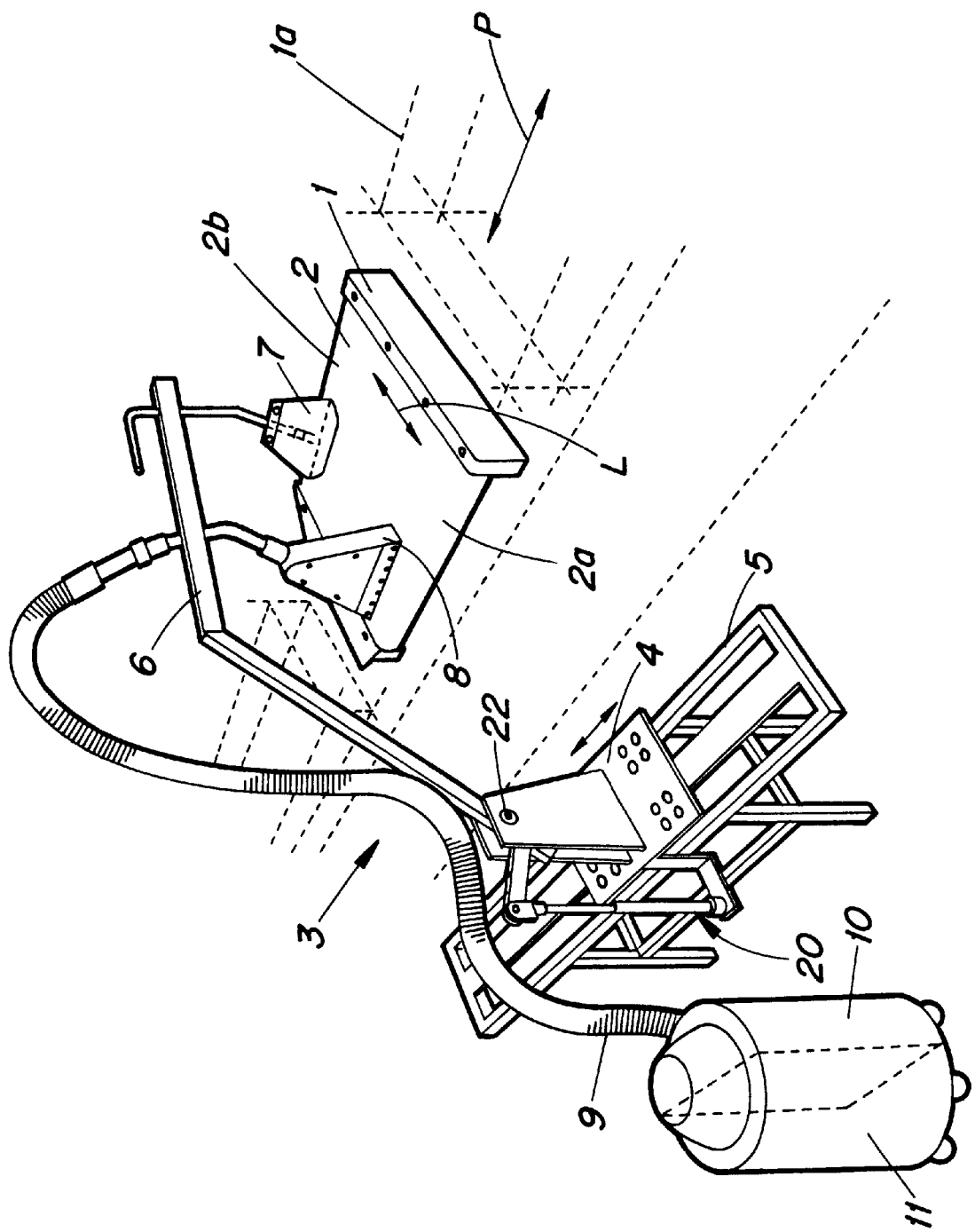

METHODS AND APPARATUS FOR CLEANING ROTATING BELTS OF ITEM-SORTING MACHINES

BACKGROUND OF THE INVENTION

This invention refers to a device for the cleaning and drying of rotating belts or mats used in sorting machines for the carrying and unloading of items to be sorted.

The industrial sorting machine sector has in recent years witnessed the diffusion of high-technology sorting machines, in which the items are placed on a mobile trolley moving along a fixed path and equipped with a rotating endless mat (belt), which constitutes a carrying and unloading plane for the items and is actuated so as to move in a direction perpendicular to that of the trolley's forward motion and to unload the carried item whenever the latter reaches a pre-established collecting station.

These machines have attained a high degree of sophistication, to the point that the items are loaded onto the machine as it passes by at high speed. Their position on the mat is precisely adjusted, and their unloading trajectory is calculated based on: their mass, the forward speed of the machine and the mat's own friction coefficient, so as to achieve the unloading of the item with the greatest precision, while still maintaining a high forward speed of the trolleys.

The precision of the trajectories imparted to the items during the unloading process is of fundamental relevance for the proper operation of the apparatus. As mentioned, this precision also depends on the friction coefficient of the material constituting the mats.

During operation it happens, however, that the surface of these mats fouls up or turns shiny, with a consequent change of the friction coefficient which tends to reduce the characteristics of a precision handling of the items, for instance due to a slipping phenomena which impairs the reliability of the loading and unloading operations.

This makes it necessary to periodically attend to a cleaning of the mats by a washing operation, which is currently effected by hand, by shutting down the facility and individually cleaning the mats on each trolley.

As can be easily seen, this is an extremely expensive operation, in particular if one considers that these fixtures are frequently equipped with several hundreds of trolleys, and that the necessary cleaning operations therefore demand a machine outage of several hours.

The purpose of this invention is to offer a solution for the mentioned problem.

SUMMARY OF THE INVENTION

According to the invention, this problem is solved by providing the sorting machine with a mat washing and drying device comprising a mobile support moving on a guide parallel to the path of the trolleys and equipped on one side with means to spray a washing liquid on the mats, and on the opposite side with means to aspirate this liquid and dry off the mats.

The device is moved to a position facing one edge of the mat and performs the washing, while the mat is set into a slowly rotating motion.

BRIEF DESCRIPTION OF THE DRAWING

A preferred embodiment of an apparatus for the cleaning of the mats according to the invention will now be described in detail, for exemplifying and non-limiting purposes, with reference to the sole FIGURE, which offers a simplified prospective view.

DETAILED DESCRIPTION OF PREFERRED EMBODIMENTS OF THE INVENTION

With reference to the sole FIGURE, 1 indicates the trolleys of a sorting machine, each of which includes a rotating endless a built in the form of a mat 2 for the carrying and unloading of the items to be sorted.

The apparatus for the washing of the mats, indicated as an overall unit by the number 3, is set up on the left side of the machine, in a suitable area adjacent the trolleys' forward path P.

This apparatus comprises a mobile base 4 set on a pair of rails or guides mounted parallel to the path of travel of the trolleys and carrying a supporting arm 6. The arm 6 holds devices 7 and 8, spaced from each other in the direction of rotation of the mat 2, one device 8 being a dispending device connected to a source of cleaning liquid and capable of dispensing the liquid to clean the surface of the mat, and the other device 7 being an asperating device communicating with a source of suction pressure and capable of aspirating said liquid for the subsequent drying phase.

For example, the device 8 consists of a spraying nozzle connected by a flexible tube 9 to a tank 10 containing water and a detergent, while the device 7 consists of an aspirating mouth connected to a suction device of a known type, which sucks up the aspirated liquid, and discharges it through a second tube, to a collecting tank.

The tanks 10 an 11 may be separate or enclosed in a single container.

In a preferred embodiment the respective lengths of the device 8 and device 7 are equal to the width of the mat 2, whereby the device 8 and aspirating device 7 are capable of operating on a cross-section of the same width as the mat 2, so as to reduce the washing and drying time to a minimum.

Alternatively, these devices could be designed, as shown, to operate on only a part of the width of the mat, so as to effect the cleaning operation in several stages, by shifting the base 4 from time to time along the guides 5 to cover the entire mat width.

The use of spray nozzles and aspirators of a size smaller than the width of the mats allows using devices of a smaller power rating.

The arm 6 may be mounted rigidly on the base 4, or fitted with a device 20 capable of adjusting its inclination about a horizontal pivot 22 so the washing devices 7, 8 approach, or move away from, the surface of the mat.

According to a further preferred embodiment, the supporting arm may be fitted with three pairs of washing and aspirating devices, so as to hold them side-by-side in such manner that they overlap one another in the operating area.

For exemplifying purposes, the operating cycle of an apparatus of the latter type will now be described.

Each of the washing devices may have a length of about 250 mm and be capable of cleaning a strip of 150 mm width.

Three of the devices set side-by-side will therefore be capable-of working efficiently on a mat of 45 cm width. The cleaning cycle envisions the cleaning of one mat at a time, while the belt rotates at a speed of about 20 cm per second.

For a standard-size mat, a time of 15 seconds can therefore be expected for spraying the detergent liquid from one side and aspirating it from the other, plus an additional 7 seconds of aspirating time alone. Considering a total time of 6 seconds for approaching and detaching the arm, plus a time of about 12 seconds to move the fixture underneath the next trolley 1a, cycling time of about 40 seconds is achieved for the complete cleaning of the mat.

According to the invention, the apparatus therefore allows to automatically perform the cleaning of the mats of an automatic sorting machine by exploiting its dead periods, for instance the night hours or weekends, while the machine is out of service.

An expert of the art may envision numerous modification and variants, all of which may however be considered to fall within the scope of this invention as defined by the appended claims.

What is claimed is:

1. A process for cleaning endlessly movable belts of a sorting system, the sorting system comprising a plurality of mobile trolleys movable along a predefined path for transporting items, each trolley including an endless belt having a belt upper section and a belt lower section, the belt being movable in a longitudinal belt direction perpendicularly to the predetermined path for receiving and discharging items, the belt upper section including opposite first and second ends spaced apart in the longitudinal belt direction, the method employing a cleaning mechanism which includes a base carrying an arm structure, a source of cleaning liquid, at least one dispensing device mounted on the arm structure and connected to the source of cleaning liquid on the base, and at least one aspirating device mounted on the arm structure and connected to a source of suction pressure, the method comprising the steps of:

A. positioning the base adjacent the predetermined path and spaced from a trolley generally in the longitudinal belt direction, wherein the first end is closer to the base than is the second end;
   B. manipulating the arm structure to position the at least one dispensing device and the at least one aspirating device in overlying relationship to an upper surface of the belt upper section, with the at least one dispensing device disposed adjacent the first end, and the at least one aspirating device disposed adjacent the second end;
   C. rotating the belt such that the upper surface moves in a direction from the first end toward the second end;
   D. actuating the at least one dispensing device to dispense cleaning liquid onto the moving upper surface;
   E. actuating the at least one aspirating device to aspirate dispensed cleaning liquid from the surface of the moving upper surface;
   F. actuating the arm structure to raise the at least one dispensing device and the at least one aspirating device at the end of a belt cleaning operation; and
   G. producing relative movement between the trolleys and the base in a direction perpendicular to the longitudinal belt direction until the base is disposed adjacent another trolley, and repeating steps B through F.

2. The process according to claim 1, further including the step of moving the at least one dispensing device and the at least one aspirating device relative to the belt surface in a direction transversely of the longitudinal belt direction subsequent to step C and prior to step F, to clean an entire width of the upper surface.

3. The process according to claim 1 wherein the arm structure raises the at least one dispensing device and the at least one aspirating device together during step F.

4. A sorting system comprising:
   a plurality of mobile trolleys movable along a predefined path for transporting items, each trolley including an endless belt having a belt upper section and a belt lower section, the belt being movable in a longitudinal belt perpendicularly to the predefined path for receiving and discharging the items, the belt upper section including opposite first and second ends spaced apart in the longitudinal belt direction; and
   a cleaning mechanism including:
      a base disposed adjacent the predetermined path and spaced from a trolley generally in the longitudinal belt direction, wherein the first end is closer to the base than is the second end, the base carrying an arm structure movable up and down,
      a source of cleaning liquid on the base,
      at least one dispensing device mounted on the arm structure and connected to the source of cleaning liquid and arranged to overlie an upper surface of the belt upper section adjacent the first end thereof for dispensing cleaning liquid onto the upper surface,
      a source of suction pressure, and
      at least one aspirating device mounted to the arm structure and connected to the source of suction pressure, and arranged to overlie the upper surface adjacent the second end thereof in spaced relationship to the dispensing device for sucking up dispensed cleaning liquid from the upper surface,
      the base and the trolleys being relatively movable in a direction perpendicular to the longitudinal belt direction to relocate the base relative to the trolleys.

5. The sorting system according to claim 4 further including means for raising or lowering the arm structure to raise or lower the at least one dispensing device and the at least one aspirating device together.

6. The sorting system according to claim 5 wherein the arm structure is mounted for pivotal movement about a horizontal axis.

7. The sorting system according to claim 4, wherein the cleaning mechanism further includes a guide, the base being mounted on the guide and movable relative thereto in the direction perpendicular to the longitudinal belt direction.

* * * * *